United States Patent Office 3,631,107
Patented Dec. 28, 1971

---

3,631,107
N,N'-BIS(ACENAPHTHENYLMETHYL)-CYCLO-HEXANEBIS(METHYLAMINES) AND THE SALTS THEREOF
Leslie G. Humber, Dollard des Ormeaux, Quebec, Canada, assignor to Ayerst, McKenna and Harrison Limited, St. Laurent, Quebec, Canada
No Drawing. Filed Oct. 24, 1969, Ser. No. 869,321
Int. Cl. C07c 87/28
U.S. Cl. 260—570.5 PA    18 Claims

ABSTRACT OF THE DISCLOSURE

Disclosed herein are N,N¹-bis(5-acenaphthenylmethyl)-1,3- and -1,4-cyclohexanebis(methylamines) and their corresponding mono- or di-N-(lower alkyl) derivatives, as well as their acid addition salts with pharmaceutically acceptable acids. The compounds and their acid addition salts are useful in preventing the excessive secretion of gastric acid, and methods for their preparation and use are given.

---

DETAILED DESCRIPTION OF THE INVENTION

The acenaphthene derivatives of Formula I possess two amino groups. Hence, these derivatives are capable of forming acid addition salts with pharmaceutically acceptable acids. Such acid addition salts are included within the scope of this invention.

The acid addition salts are prepared by reacting the base form of the acenaphthene derivative with either two equivalents or preferably an excess of the appropriate acid in an organic solvent, such as ether or an ethanol-ether mixture. These salts, when administered to mammals, possess the same activity as the base itself, in preventing the secretion of excessive amounts of hydrochloric acid. For many purposes it is preferable to administer the salts rather than the base compound. Among the acid addition salts suitable for this purpose are salts such as the sulfate, phosphate, lactate, tartrate, maleate, citrate and hydrochloride. Both the base compound itself and the above acid addition salts have the distinct advantage of possessing a relatively low order of toxicity.

Also included in this invention are the cis and trans isomers of the acenaphthene derivatives of Formula I. This cis and trans isomerism results from various configurations in which the two substituents of the cyclohexane portion may exist. Individual optical isomers, which might be separated by fractional crystallization of the diastereoisomeric salts formed, for instance, with $d$- or $l$-tartaric acid or D-(+)-α-bromocamphor sulfonic acid are also included.

The useful property of the acenaphthene derivatives and their acid addition salts with pharmaceutically acceptable acids as agents for preventing the excessive secretion of gastric acid and hyperchlorhydria may be demonstrated by the use of rats, more especially the Shay rat. The rat is the preferred experimental mammal for demonstrating the activity of agents effecting gastric acid secretion and it has been widely used in pharmacology for this purpose; see, for example, the article by Shay et al., Gastroenterology, 26, 906 (1954).

More specifically, it has been demonstrated that when the acenaphthene derivatives of this invention or their above acid addition salts are administered to Shay rats according to the method of Shay, see Shay cited above, substantial reduction in the basal hydrochloric acid secretion, as compared to control values, results.

When the acenaphthene derivatives of this invention are employed as agents for preventing the excessive secretion of gastric acid in warm-blooded mammals, e.g. rats, they may be used alone or in combination with pharmacologically acceptable carriers. The proportion of the compounds is determined by their solubility and chemical nature, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.5 mg. to about 10 mg. per kilo per day, although as aforementioned variations will occur. However, a dosage level that is in the range of from about 1.0 mg. to about 4.0 mg. per kilo per day is most desirably employed in order to achieve effective results.

For the preparation of the acenaphthene derivatives of this invention of Formula I in which $R^1$ and $R^2$ represent the same radical as described above, I have found it convenient to use the process illustrated by Fig. 1.

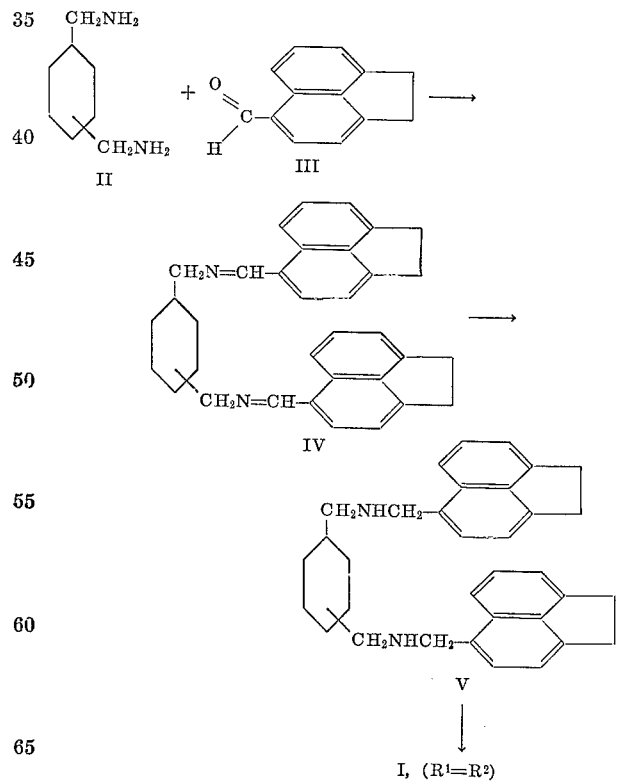

Fig.

In practising the above process, the appropriate cyclohexanebis(methylamine) of structure II, either cyclohexane-1,3-bis(methylamine) described by L. G. Humber, in J. Med Chem., 8, 401 (1965) or commercially available cyclohexane-1,4-bis(methylamine), is allowed to react in an inert solvent, such as, for example, benzene, with 5-acenaphthaldehyde, described by L. F. Fieser and J. E. Jones, in J. Am. Soc., 64, 166 (1942), to form the Schiff base of Formula IV. The Schiff base is converted by treatment with a reducing agent, preferably sodium borohydride, to the diamine of Formula V. The diamine of Formula V is transformed into the acenaphthene derivatives of Formula I in which $R^1$ and $R^2$ are lower alkyl by conventional N-alkylation procedures, such as reductive alkylation or alkylation with a dialkyl sulfate or an alkyl halide, described by L. F. Fieser and M. Fieser in "Advanced Organic Chemistry," Reinhold Publishing Corporation, New York, 1961, pp. 495–497, or R. B. Wagner and H. D. Zook in "Synthetic Organic Chemistry," John Wiley and Sons, Inc., New York, 1953, pp. 666–670. Alternatively, the compounds of Formula I in which $R^1$ and $R^2$ represent hydrogen may be acylated by reaction with an appropriate acyl halide, and the resulting N-acylated derivatives may be treated with a reducing agent, preferably a complex alkali metal aluminum hydride, to yield the compounds of Formula I in which $R^1$ and $R^2$ represent the same lower alkyl radical.

Alternatively, the diamine of Formula V may also be prepared conveniently in the following manner: an appropriate cyclohexanedicarbonyl bromide or chloride, preferably either cyclohexane-1,3-dicarbonyl chloride or cyclohexane-1,4-dicarbonyl chloride prepared from their corresponding cyclohexane dicarboxylic acids, described by H. A. Smith and F. P. Byrne, J.A.C.S., 72, p. 4406 (1950) by treatment with thionyl chloride in the presence of dimethylformamide, is allowed to react with 5-acenaphthenylmethylamine, described by H. J. Richter, J. Am. Chem. Soc., 75, p. 2774 (1953), in an inert solvent, for example, ethylenedichloride, containing an excess of a proton acceptor such as for example, sodium hydroxide. The resulting dicarboxamide, either N,N¹-di(5-acenaphthenylmethyl)cyclohexane-1,3- or 1,4-dicarboxamide, is converted to its corresponding diamine of Formula V by reduction with an alkali metal aluminum hydride complex, such as, for example, lithium aluminum hydride.

The preceding alternate method for the prepartion of the diamine of Formula V together with the N-alkylation steps described above constitutes a second process for preparing the acenaphthene derivatives of Formula I in which $R^1$ and $R^2$ are the same radical. This process is graphically represented by Fig. 2 in which X represents a chlorine or bromine atom and $R^1$ and $R^2$ are as defined above.

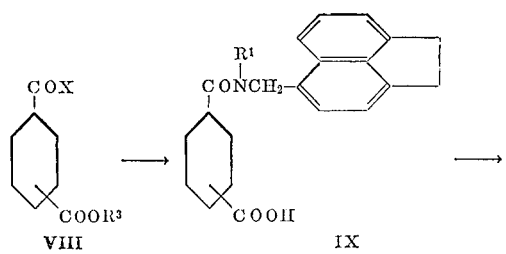

Fig. 2

A convenient and efficient process for the preparation of the acenaphthene derivatives of Formula I in which $R^1$ and $R^2$ are different radicals is illustrated by Fig. 3 in which X represents a chlorine or bromine, $R^3$ represents a lower alkyl containing one to three carbon atoms, $R^1$ represents lower alkyl and $R^2$ is hydrogen or a lower alkyl radical different from $R^1$.

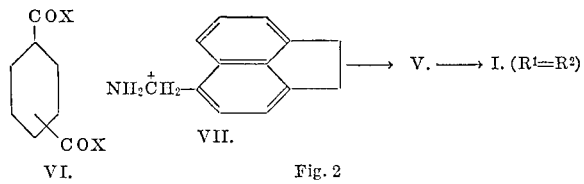

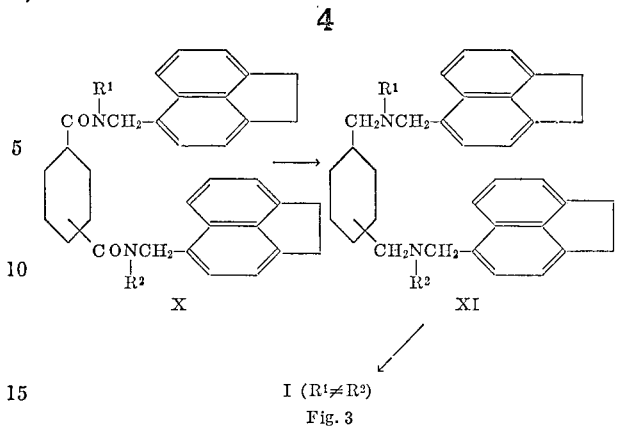

Fig. 3

On perusal of the process illustrated by Fig. 3, it is apparent that the acenaphthene derivatives of Formula I in which $R^1$ equals $R^2$ may also be made by this process if the new radical introduced by the step XI→I is the same as that represented by $R^1$. However, in actual practice it has been found to be expedient to prepare these latter compounds by either of the first two processes above.

In practising the process illustrated by Fig. 3, the appropriate alkoxycarbonylcyclohexanecarbonyl halides of Formula VIII which I prefer as starting materials are either 3-methoxycarbonylcyclohexanecarbonyl chloride, prepared from 3-methoxycarbonylcyclohexanecarboxylic acid, described by F. Ramirez and J. W. Sargent, J. Am. Chem. Soc. 74, 5785 (1952), by treatment with thionyl chloride in the presence of dimethylformamide, or 4-methoxycarbonylcyclohexanecarbonyl chloride, described by H. L. Yale, U.S. Pat. No. 2,672,472 or prepared from its corresponding free acid, described by S. Siegal and J. M. Komarmy, J. Am. Chem. Soc., 82, 2547 (1960) in the same manner as described above.

When preparing the acenaphthene derivatives of Formula I in which $R^1$ and $R^2$ are different radicals as defined above, the above starting materials of Formula VIII are allowed to react with an appropriate amine in an inert solvent, preferably ethylenedichloride, containing an excess of a proton acceptor, such as, for example sodium hydroxide, to yield the desired acid amide of Formula IX.

The appropriate amines used in the foregoing reaction are N-(lower alkyl)-5-acenaphthenylmethylamines such as, for example, N-methyl-, N-ethyl-, N-propyl-, or N-butyl-5-acenaphthenylmethylamine. Those amines are prepared from 5-acenaphthenylmethylamine, described above, by N-alkylation procedures described by L. F. Fieser and M. Fieser, cited above. A particularly suitable method of N-alkylation for the preparation of N-methyl-5-acenaphthenylmethylamine is the two step procedure involving first the treatment of 5-acenaphthenylmethylamine with the mixed anhydride from formic and acetic acids and then reducing the resulting N-formyl-5-acenaphthenylamine with lithium aluminum hydride. Other alkyl groups may be introduced by acylation with the appropriate acyl halide, followed by reduction of the resulting N-acyl derivative with a reducing agent, preferably a complex alkali metal aluminum hydride.

In the next step of this process, the acid amide of Formula IX is converted by treatment with thionyl chloride to its corresponding acid chloride, which in turn is condensed with an appropriate amine, 5-acenaphthenylmethylamine of its corresponding N-(lower alkyl), for example the N-methyl, N-ethyl, N-propyl, or N-butyl derivative, described above. This condensation is performed in the same manner as the foregoing amine condensation (VIII→IX) of this process; however, a different amine from the one previously employed is used. In this manner the diamide of Formula X is obtained.

Subsequently, reduction of the diamide of Formula X with an alkali metal aluminum hydride complex, preferably lithium aluminum hydride, affords the acenaphthene derivatives of Formula I in which $R^1$ and $R^2$ are different radicals as defined above.

Finally, it is the intention to cover all changes and modifications of the example of the invention herein chosen for purpose of disclosure which are within the scope and spirit of this invention. For example, in the process depicted by FIG. 2, the act of using N-ethyl-5-acenaphthenylmethylamine instead of 5-acenaphthenylmethylamine (VII), thus eliminating the alkylation step, V→I, would not depart from the spirit or scope of this invention.

Similarly, it will be apparent to those skilled in the art that a large number of variations in the process of this invention may be carried out in the process of Fig. 3 without departing from the spirit of this invention, depending upon the sequence in which the various N-(lower alkyl)-5-acenaphthenylmethylamines are introduced. For example, when it is desired to prepare the compound of Formula I in which $R^1$ represents the methyl group and $R^2$ represents the butyl group, an alkoxycarbonylcyclohexanecarbonyl halide may first be reacted with N-methyl-5-acenaphthenylmethylamine, the resulting compound may be converted to the corresponding acid halide, and the latter may then be reacted with N-butyl-5-acenaphthenylmethylamine, to give, after reduction of the resulting diamide, the desired compound. Alternatively, the alkoxycarbonylcyclohexanecarbonyl halide may first be reacted with N-butyl-5-acenaphthenylmethylamine, the resulting compound may be converted to the corresponding acid halide, and the latter may then be reacted with N-methyl-5-acenaphthenylmethylamine to give, after reduction of the resulting diamide, the desired compound. As another alternative, the alkoxycarbonylcyclohexanecarbonyl halide may be reacted first with N-methyl-5-acenaphthenylmethylamine, the resulting compound converted to the corresponding acid halide, and the latter may then be reacted with 5-acenaphthenylmethylamine to yield, after reduction of the resulting diamide, the compound of Formula I in which $R^1$ represents methyl and $R^2$ represents hydrogen, which is in turn treated with butyl bromide to yield the desired compound. In this alternative the order of introducing the methyl and the butyl substituents may again be reversed. All such minor variations are deemed to be within the scope of this invention.

The following examples will illustrate further this invention.

Example 1

Sodium borohydride (4.0 g.) is added portionwise to a suspension of the Schiff base

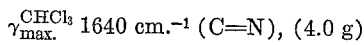 1640 cm.$^{-1}$ (C=N), (4.0 g)

prepared from 5-acenaphthaldehyde and cyclohexane-trans-1,4-bis(methylamine), in 600 ml. of 20% benzene in ethanol. On completion of the addition the reaction mixture is subjected to reflux for 16 hours. On cooling a precipitate results. The solvent is decanted and evaporated and the residue along with the precipitate is dissolved in 50% chloroform and water. The chloroform phase is separated, washed with water, dried over sodium sulfate and the solvent evaporated to yield a white solid. The white solid is crystallized from benzene to afford N,$N^1$ - bis(5-acenaphthenylmethyl) - trans - 1,4 - cyclohexanebis-(methylamine) as crystals, M.P. 158° C.,

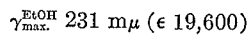 231 m$\mu$ ($\epsilon$ 19,600)

This free base is converted to the dilactate salt as follows: 2.0 g. of the base is dissolved in 5 ml. of warm dimethylformamide and to this solution is added a solution of 2 ml. of 88% lactic acid in 10 ml. of warm dimethylformamide. On cooling, crystals are deposited. The crystals are collected and recrystallized from dimethylformamide yielding the pure dilactate salt, M.P. 219–220° C.

In the same manner but using an equivalent amount of cyclohexane-cis-1,4-bis(methylamine) instead of cyclohexane-trans-1,4-bis(methylamine), N,$N^1$ - bis(5 - acenaphthenylmethyl)-cis-1,4 - cyclohexanebis(methylamine) is obtained.

Example 2

Cis-cyclohexane-1,4-dicarbonylchloride (8.8 g., 0.04 mole), B.P. 110°/5 mm., is added dropwise in 100 ml. of ethylenedichloride, to a well stirred mixture of 5-acenaphthenylmethylamine (15.0 g., 0.082 mole), 41.0 ml. of 2.0 N NaOH (0.082 mole) and 200 ml. of ethylenedichloride.

The mixture is stirred at room temperature for 16 hours. The precipitated product is collected, washed thoroughly with water, then with acetone and dried to yield the intermediate N,$N^1$-di(5-acenaphthenylmethyl) cyclohexane-cis-1,4-dicarboxamide, M.P. >250° C. This intermediate product is very insoluble; it is not purified further but used as follows:

N,$N^1$ - di(5 - acenaphthenylmethyl)cyclohexane-cis-1,4-dicarboxamide (6.0 g.) is refluxed for 25 hours with 7.0 g. of lithium aluminum hydride (LAH) in 300 ml. of tetrahydrofuran (freshly distilled from LAH). Addition of water, filtration, drying of the filtrate, and evaporation yields the crude free base, N,$N^1$-bis(5-acenaphthenylmethyl)-cis-1,4-cyclohexanebis(methylamine). Recrystallization from ethyl acetate gives the purified free base, M.P. 114–116° C. (The corresponding dihydrochloride salt of this base has M.P.>250° C.)

In the same manner, but using an equivalent amount of trans-cyclohexane-1,4-dicarbonylchloride, M.P. 67° C., instead of cis-cyclohexane-1,4-dicarbonylchloride, N,$N^1$-bis(5-acenaphthenylmethyl)-trans - 1,4 - cyclohexanebis-(methylamine), is obtained. Accordingly, N,$N^1$-di(5-acenaphthenylmethyl)cyclohexane - trans-1,4-dicarboxamide is the intermediate product.

Example 3

Using either the manipulative procedure described in Example 1 but using an equivalent amount of cyclohexane-1,3-bis(methylamine) instead of cyclohexane-trans-1,4-bis(methylamine) or the manipulative procedure described in Example 2 but using an equivalent amount of cyclohexane - 1,3 - dicarbonylchloride, B.P. 118°/2 mm., mixture of cis and trans isomers, instead of cis-cyclohexane-1,4-dicarbonylchloride, the diamine of Formula V, N,$N^1$-bis(5-acenaphthenylmethyl) - 1,3 - cyclohexane-bis-(methylamine), M.P. 136–139° C., is obtained. The corresponding dihydrochloride of this product has M.P. >250° C.

When using the manipulative procedure of Example 2 for the preparation of the diamine of this Example, N,$N^1$-di(5-acenaphthenylmethyl)cyclohexane - 1,3 - dicarboxamide, M.P. >250° C., is the intermediate.

Example 4

Examples of two methods for the N-methylation of N,$N^1$-bis(5-acenaphthenylmethyl) - trans - 1,4-cyclohexanebis(methylamine), prepared as described in Examples 1 and 2, are given.

Method A.—N,$N^1$-bis(5 - acenaphthenylmethyl)-trans-1,4-cyclohexane-bis(methylamine) (2.0 g.) is heated with 90% formic acid (5 ml.), 36% formaldehyde (5 ml.) and water (5 ml.) for 4½ hours on the steam bath. The mixture is made alkaline with aqueous NaOH and extracted with CHCl$_3$. Evaporation of the extract gives a gum which is crystallized from benzene-hexane to give N,$N^1$-bis(5-acenaphthenylmethyl) - N,$N^1$ - dimethyl-trans-1,4-cyclohexanebis(methylamine), M.P. 152–153° C. The corresponding dihydrochloride of this product has M.P. >250° C.

Method B.—The diamine of Formula V, N,$N^1$-bis(5-acenaphthenylmethyl) - trans-1,4-cyclohexanebis(methylamine) (2.0 g.), is heated with dimethylsulfate (0.2 g.) and potassium hydroxide (0.4 g.) in 100 ml. of acetone for 4 hours. The reaction mixture is cooled, diluted with ether and water and shaken. The ether layer is separated, washed with 10% sodium hydroxide solution and water, dried (Na$_2$SO$_4$), filtered and evaporated. The residue is recrystallized from benzene-hexane to yield a product identical to N,N$^1$-bis(5-acenaphthenylmethyl) - N,N$^1$ - dimethyl-trans-1,4 - cyclohexanebis(methylamine) obtained by Method A of this example.

Using either Method A or B but using an equivalent amount of N,N$^1$-bis(5-acenaphthenylmethyl)-cis-1,4-cyclohexanebis(methylamine) prepared as described in Examples 1 and 2, or N,N$^1$-bis(5-acenaphthenylmethyl)-1,3-cyclohexanebis(methylamine), prepared as described in Example 3, instead of N,N$^1$-bis-(5-acenaphthenylmethyl)-trans-1,4-cyclohexanebis(methylamine), the corresponding N,N$^1$-dimethyl derivatives, N,N$^1$-bis(5-acenaphthenylmethyl)-N,N$^1$-dimethyl-cis - 1,4 - cyclohexanebis(methylamine) or N,N$^1$-bis(5-acenaphthenylmethyl) - N,N$^1$ - dimethyl-1,3-cyclohexanebis(methylamine) are obtained, respectively. These two N,N$^1$-dimethyl derivatives yield acid addition salts, for example, the dihydrochloride of the former has M.P. 250° C. and the dimaleate of the latter has M.P. 171–173° C.

Using Method B, but using an equivalent amount of diethylsulfate or ethyl, propyl, or butyl bromide instead of dimethylsulfate and using either N,N$^1$-bis(5-acenaphthenylmethyl)-trans-1,4-, cis-1,4-, or 1,3-cyclohexanebis-(methylamine), N,N$^1$-bis(5-acenaphthenylmethyl)-N,N$^1$-diethyl-trans-1,4-cyclohexanebis(methylamine),
N,N$^1$-bis(5-acenaphthenylmethyl)-N,N$^1$-diethyl-cis-1,4-cyclohexanebis(methylamine) and
N,N$^1$-bis(5-acenaphthenylmethyl)-N,N$^1$-diethyl-1,3-cyclohexanebis(methylamine),
N,N$^1$-bis(5-acenaphthenylmethyl)-N,N$^1$-dipropyl-trans-1,4-cyclohexanebis(methylamine),
N,N$^1$-bis-(5-acenaphthenylmethyl)-N,N$^1$-dipropyl-cis-1,4-cyclohexanebis(methylamine),
N,N$^1$-bis(5-acenaphthenylmethyl)-N,N$^1$-dipropyl-1,3-cyclohexanebis(methylamine),
N,N$^1$-bis-(5-acenaphthenylmethyl)-N,N$^1$-dibutyl-trans-1,4-cyclohexanebis(methylamine),
N,N$^1$-bis-(5-acenaphthenylmethyl)-N,N$^1$-dibutyl-cis-1,4-cyclohexanebis(methylamine), and
N,N$^1$-bis(5-acenaphthenylmethyl)-N,N$^1$-dibutyl-1,3-cyclohexanebis(methylamine),
are obtained respectively.

Method C.—N,N$^1$-bis-(5-acenaphthenylmethyl)-1,3- or -1,4-cyclohexane-bis(methylamine)(cis or trans isomer, 3.0 g.) is refluxed in a mixture of pyridine (10 ml.) and acetic anhydride (5 ml.) for 2 hours, cooled, poured into ice water, the precipitated diacetyl derivative filtered, and dried. It is dissolved in dry tetrahydrofuran (60 ml.), lithium aluminum hydride (2 g.) is added, the mixture is refluxed for 24 hours, decomposed by addition of water, filtered, and the filtrate extracted with benzene. Evaporation of the solvent yields N,N$^1$-bis(5-acenaphthenylmethyl)-N,N$^1$-diethyl-1,3- or 1,4-cyclohexanebis(methylamine), cis or trans isomer, respectively, identical with the compounds described above. In the same manner, but using propionic or butyric anhydride instead of acetic anhydride, the corresponding N,N$^1$-dipropyl and N,N$^1$-dibutyl derivatives described above are also obtained.

Example 5

5 - acenaphthenylmethylamine (1.8 g.) is added to formic-acetic mixed anhydride (20 ml.). The mixture is heated on the steam bath briefly to effect solution, then allowed to remain at 22° overnight. The reaction mixture is poured into water. The precipitate is washed well with water and dried to yield N-formyl-5-acenaphthenylmethylamine, M.P. 180–183° C. Recrystallization of a portion of this product from acetonitrile gives crystals, M.P. 186–187° C.

Example 6

N - formyl - 5 - acenaphthenylmethylamine (21.2 g.), obtained as described in Example 5, is refluxed for 16 hours with 9.5 g. of LAH in 500 ml. of anhydrous tetrahydrofuran. Conventional work-up procedure gives the product, N - methyl-5-acenaphthenylmethylamine, as an oil. Treatment of this oil with hydrogen chloride in ether solution yields N-methyl - 5 - acenaphthenylmethylamine hydrochloride, which is recrystallized from ethanol-ether to give crystals, M.P. 234–235° C.

Example 7

The alkoxycarbonylcyclohexanecarbonyl halide, trans-4 - methoxycarbonylcyclohexanecarbonylchloride (13.95 g.), B.P. 118° C./3 mm., in 20 ml. of dichloroethane is added dropwise to a mixture of N-methyl - 5 - acenaphthenylmethylamine hydrochloride (15.89 g.), prepared as described in Example 6, and 68 ml. of 2 N NaOH in 300 ml. of dichloroethane. The reaction is worked up in the usual manner (see Example 2) to yield the methyl ester of trans-4-[4-methyl - N- 5 - acenaphthenylmethyl] cyclohexanecarboxylic acid. The corresponding free acid is obtained by hydrolysis with sodium hydroxide in methanol. The corresponding free acid is converted to its acid chloride, trans-4-[4-methyl-N - 5 - acenaphthenylmethyl cyclohexanecarbonyl chloride, by treatment with excess thionyl chloride in benzene solution for 16 hours. Subsequent removal of volatile material from the reaction mixture affords the desired acid chloride.

The acid chloride (18.0 g.) is condensed with 5-acenaphthenylmethylamine (8.91 g.) in the usual manner to give the corresponding diamide of Formula X which is reduced directly by refluxing with LAH (15:2 g.) in 400 ml. of tetrahydrofuran. The reaction is worked up in the conventional way to give the product N,N$^1$ - bis(5-acenaphthenylmethyl) - N - methyl - trans - 1,4-cyclohexanebis(methylamine). The product is purified by chromatography on basic alumina, activity II. Elution with benzene-hexane (1:1) affords the purified product, which is converted to its dihydrochloride salt obtained as a sesquihydrate, M.P. >250° C.

In the same manner, but using an equivalent amount of 4-methoxycarbonylcyclohexanecarbonyl chloride (a mixture of cis and trans isomers prepared according to the method of Yale, cited above) or 3-methoxycarbonylcyclohexanecarbonyl chloride (prepared by treating a mixture of cis and trans isomers of the corresponding acid, described by F. Ramirez and J. W. Sargent, cited above, with thionyl chloride in the usual manner) instead of trans - 4 - methoxycarbonylcyclohexanecarbonyl chloride, N,N$^1$-bis(5 - acenaphthenylmethyl) - N - methyl - 1,4- or -1,3-cyclohexanebis(methylamine) are obtained as a mixture of cis and trans isomers.

In the same manner as described in the first two paragraphs of this example, but using an equivalent amount of N-ethyl-5-acenaphthenylmethylamine instead of N-methyl-5-acenaphthenylmethylamine hydrochloride and using as the alkoxycarbonylcyclohexanecarbonyl halide, either 3- or 4-methoxycarbonylcyclohexanecarbonyl chloride (mixture of cis and trans isomers), N,N$^1$-bis(5-acenaphthenylmethyl)-N-ethyl-1,4- or -1,3 - cyclohexanebis(methylamine) are obtained as a mixture of cis and trans isomers.

Any of the above products of this example may be converted to their corresponding N-methyl-N$^1$-ethyl, N-methyl-N$^1$-propyl, N-methyl-N$^1$-butyl, N - ethyl - N$^1$-propyl, or N-ethyl-N$^1$-butyl derivatives by alkylation in the usual manner, see for example Example 4.

In the same manner as described in the first three paragraphs of this example, but using an equivalent amount of N-ethyl-, N-propyl-, or N-butyl-5-acenaphthenylmethylamine (prepared from 5-acenaphthenylamine according to the procedure described in Example 4, Method B), instead of 5-acenaphthenylmethylamine and using as the alkoxycarbonylcyclohexanecarbonyl halide, either 3- or 4 - methoxycarbonylcyclohexanecarbonyl chloride (mixtures of cis and trans isomers), N,N¹-bis(5-acenaphthenylmethyl - N - methyl - N¹ - ethyl-, N-methyl-N¹-propyl-, or N-methyl-N¹-butyl-1,4-, or -1,3 - cyclohexanebis(methylamine) are obtained as a mixture of cis and trans isomers.

The following compounds are also obtained in this manner:

N,N¹-bis(5-acenaphthenylmethyl)-N-propyl-1,4- or 1,3-cyclohexanebis(methylamine)
N,N¹-bis(5-acenaphthenylmethyl)-N-butyl-1,4- or 1,3-cyclohexanebis(methylamine)
N,N¹-bis(5-acenaphthenylmethyl)-N-ethyl-N¹-propyl-1,4- or -1-3-cyclohexanebis(methylamine)
N,N¹-bis(5-acenaphthenylmethyl)-N-ethyl-N¹-butyl-1,4- or 1,3-cyclohexanebis(methylamine)
N,N¹-bis(5-acenaphthenylmethyl)-N-propyl-N¹-butyl-1,4- or -1,3-cyclohexanebis(methylamine)

I claim:
1. A compound selected from those of the formulae

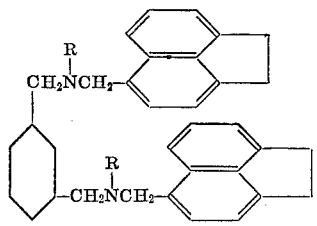

and

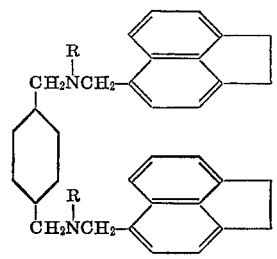

wherein R is selected from the group which consists of hydrogen and lower alkyl; and acid addition salts thereof with pharmaceutically acceptable acids.

2. N,N¹-bis(5-acenaphthenylmethyl) - 1,3 - cyclohexanebis(methylamine), as claimed in claim 1.

3. N,N¹-bis(5-acenaphthenylmethyl) - 1,4 - cyclohexanebis(methylamine), as claimed in claim 1.

4. N,N¹-bis(5-acenaphthenylmethyl)-trans - 1,4 - cyclohexanebis(methylamine), as claimed in claim 1.

5. N,N¹ - bis(5 - acenaphthenylmethyl) - cis 1,4 - cyclohexanebis(methylamine), as claimed in claim 1.

6. N,N¹-bis(5-acenaphthenylmethyl) - N,N¹ - dimethyl-1,3-cyclohexanebis(methylamine), as claimed in claim 1.

7. N,N¹-bis(5-acenaphthenylmethyl) - N,N¹ - dimethyl-1,4-cyclohexanebis(methylamine), as claimed in claim 1.

8. N,N¹-bis(5 - acenaphthenylmethyl)-N,N¹-dimethyl-trans - 1,4 - cyclohexanebis(methylamine), as claimed in claim 1.

9. N,N¹-bis(5-acenaphthenylmethyl) - N,N¹ - dimethyl-cis - 1,4 - cyclohexanebis(methylamine), as claimed in claim 1.

10. N,N¹-bis-(5-acenaphthenylmethyl) - N,N¹ - diethyl-1,3-cyclohexanebis(methylamine), as claimed in claim 1.

11. N,N¹-bis(5-acenaphthenylmethyl) - N,N¹ - diethyl-1,4-cyclohexenebis(methylamine), as claimed in claim 1.

12. N, N¹-bis(5-acenaphthenylmethyl) - N,N¹ - diethyl-trans - 1,4 - cyclohexanebis(methylamine), as claimed in claim 1.

13. N,N¹-bis(5-acenaphthenylmethyl) - N,N¹ - diethyl-cis - 1,4 - cyclohexanebis(methylamine), as claimed in claim 1.

14. N,N¹-bis(5-acenaphthenylmethyl) - N - methyl-1,3-cyclohexanebis(methylamine), as claimed in claim 1.

15. N,N¹-bis(5-acenaphthenylmethyl) - N - methyl-1,4-cyclohexanebis(methylamine), as claimed in claim 1.

16. N,N¹ - bis(5 - acenaphthenylmethyl) - N - methyl-trans - 1,4 - cyclohexanebis(methylamine), as claimed in claim 1.

17. N,N¹ - bis(5 - acenaphthenylmethyl) - N - ethyl-1,3-cyclohexanebis(methylamine), as claimed in claim 1.

18. N,N¹ - bis(5 - acenaphthenylmethyl) - N - ethyl-1,4-cyclohexanebis(methylamine), as claimed in claim 1.

References Cited
UNITED STATES PATENTS 3,239,558  3/1966  Humber _____ 260—570.5

ROBERT V. HINES, Primary Examiner

U.S. Cl. X.R.

260—468 R, 501.2, 501.21, 514 R, 515 R, 562 P, 566 F, 570.9; 424—330